July 15, 1952 — S. G. ESKIN ET AL — 2,603,509
CONTROL DEVICE BODY
Filed June 7, 1946 — 2 SHEETS—SHEET 1
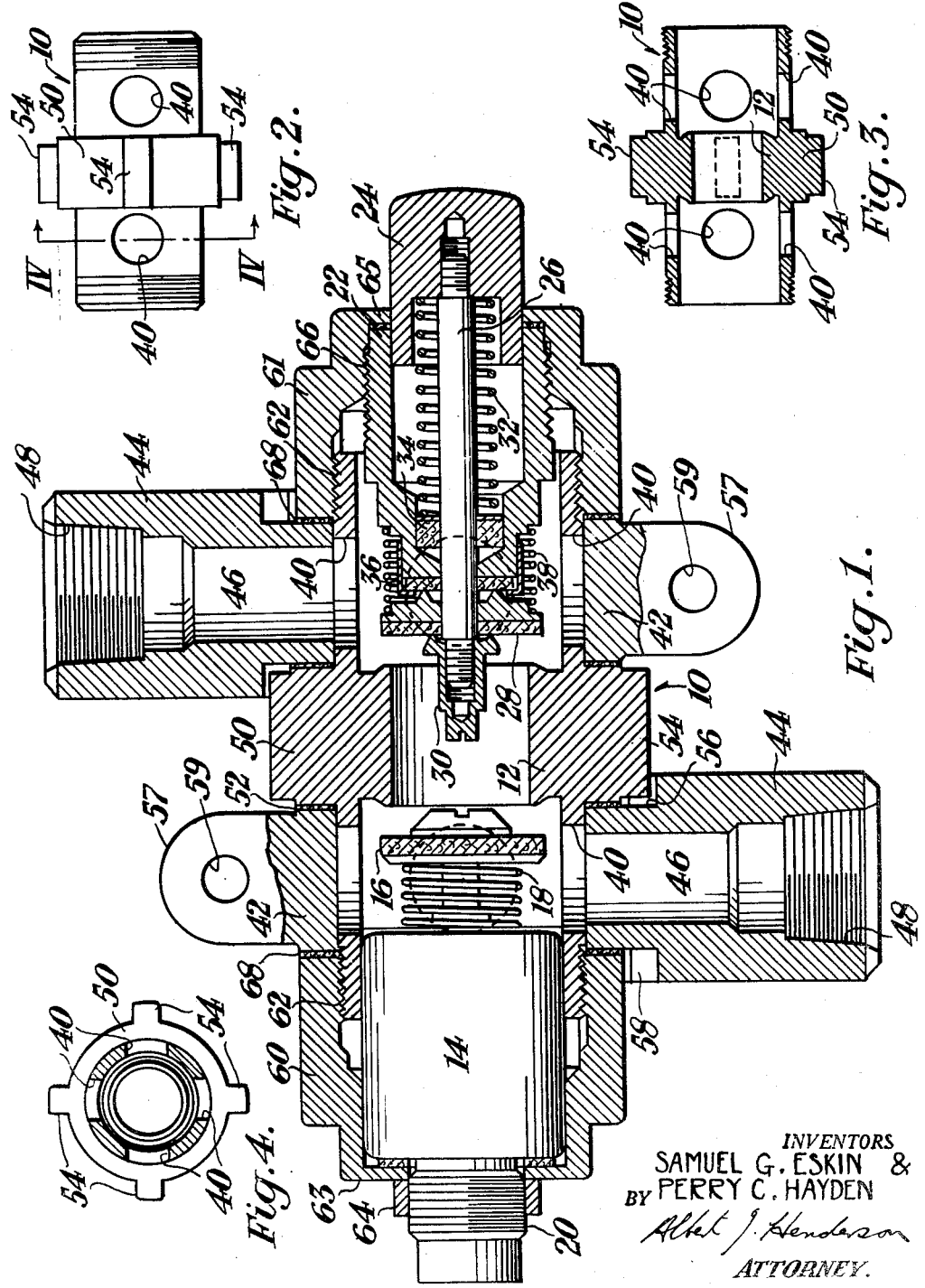
INVENTORS
SAMUEL G. ESKIN &
BY PERRY C. HAYDEN
Albert J. Henderson
ATTORNEY.

July 15, 1952  S. G. ESKIN ET AL  2,603,509
CONTROL DEVICE BODY

Filed June 7, 1946  2 SHEETS—SHEET 2

INVENTORS
SAMUEL G. ESKIN &
BY PERRY C. HAYDEN

Albert J Henderson
ATTORNEY.

Patented July 15, 1952

2,603,509

UNITED STATES PATENT OFFICE 2,603,509

CONTROL DEVICE BODY

Samuel G. Eskin and Perry C. Hayden, Los Angeles, Calif., assignors to Robertshaw-Fulton Controls Company, a corporation of Delaware Application June 7, 1946, Serial No. 675,038

4 Claims. (Cl. 285—96.3)

This invention relates to fluid control devices and, more particularly, to the body portions of such devices arranged with adjustable connections for the fluid flow.

Devices adapted for fluid flow control are installed in many different positions relative to the piping layout. Where the inlet and outlet connections for the device are fixed with respect to the control body it is necessary to provide large numbers of different bodies with the connections at different circumferential positions. Thus, the so-called "straight-through" and "ninety-degree" angular connections are often multiplied in several different arrangements while other types of connections require still further diversity of location on the control body.

An object of this invention is to reduce the number of different type bodies required to suit various piping arrangements.

Another object of the invention is to secure a wide diversity of both inlet and outlet arrangements relative to the piping and each other.

Another object of the invention is to utilize a minimum number of parts which can be standardized and applied in numerous different combinations as required by the exigencies of piping layout.

Another object of the invention is to permit a wide choice of different installation arrangements to suit various conditions under which the control device is used.

Another object of the invention is to ensure correct assembly of the parts to obtain the desired inlet and outlet arrangements.

Another object of the invention is to avoid any obstruction of the fluid flow as might be caused by misalignment of parts during assembly or installation or use of the device.

Other objects and advantages will become apparent from the following description taken in connection with the accompanying drawings, wherein:

Fig. 1 is a longitudinal section on an enlarged scale through a thermomagnetic safety device embodying the invention;

Fig. 2 is an elevation of the tubular body portion;

Fig. 3 is a longitudinal section of the tubular body portion;

Fig. 4 is a section taken on the line IV—IV of Fig. 2;

Figure 5:
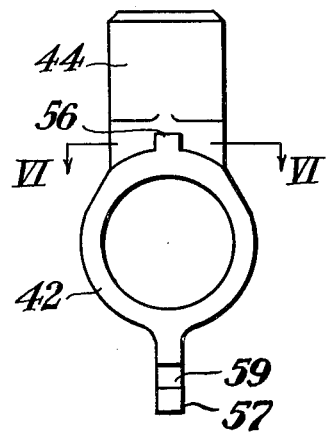
Fig. 5 is an end elevation, partly in section, of the connecting member.

Referring more particularly to Fig. 1 of the drawings, the fluid flow control device to which the invention is applied is shown as comprising a thermomagnetic safety structure having a tubular body member 10 provided with an internal annular valve seat 12 interrupting the flow passage through the tubular body member 10 at a point substantially midway between the ends. One end of the tubular member 10 supports an electromagnetic device 14 embodying the usual winding and armature (not shown). The electromagnetic device 14 is operable to retain a valve member 16 carried thereby in spaced arrangement with one side of the valve seat 12 when the electromagnet is energized and to permit the valve member 16 to engage the valve seat 12 under bias of a spring 18 when the magnet is deenergized. The opposite end of the electromagnetic device projects from the tubular member 10 and carries the usual terminal connector 20 through which the leads (not shown) for the magnet winding are carried.

The opposite end of the tubular member 10 houses the resetting mechanism for the electromagnetic device 14. The resetting mechanism comprises a housing 22 suitably apertured at one end for slidable engagement with a push-button 24 which projects therefrom. A reset stem 26 is secured at one end to the push-button and the opposite end of this stem projects through the housing 22 toward the valve member 16. The reset stem 26 can be reciprocated in the housing 22 by manual pressure on the push-button. The stem carries a second valve member 28 adapted to engage the opposite side of the valve seat 12 when such reciprocation occurs. The flow past the valve seat 12 is thus interrupted during the resetting operation when the main valve member 16 is moved off its seat. To effect such movement the valve member 16 is engageable with a projecting end 30 of the reset stem 26.

The flow interrupter valve 28 is normally biased away from the valve seat 12 by a coil spring 32 operative between the push-button 24 and a packing disc 34 for the reset stem 26. A second packing disc 36 secured on the end of the housing 22 is adapted to be engaged by the flow interrupter valve 28 in its biased position and serves as an additional seal against leakage along the reset stem 26. A second coil spring 38 is operative between the flow interrupter 28 and the housing 22 to assist manual pressure on the push-button in engaging the flow interrupter 28 with the valve seat 12 during the resetting operation. As will be apparent, the coil spring 32 is stronger than the spring 38 in order that the described biased position of the flow interrupter 28 may be established.

This invention is more particularly directed toward the structure of the body of the control device in order that adjustable connections for the inlet and outlet of the flow passage of the tubular member 10 may be obtained. To this end, the tubular member 10 is provided with a plurality of ports extending through the wall thereof on either side of the valve seat 12. In this instance, four ports 40 are utilized on each side of the valve seat 12 and are spaced circumferentially around the tubular member 10 substantially ninety degrees apart. It will be apparent that more or less ports 40 may be utilized depending upon the number of adjusted positions required. One set of ports 40 serves as inlet ports and the other set as outlet ports for the tubular member 10. In this embodiment the right-hand ports as viewed in Fig. 1 are the outlet ports and the left-hand ports are the inlet ports.

A pair of connecting members each having an annular portion 42 and a hollow end portion 44 are provided for cooperation with the tubular member 10 to afford adjustable connecting means. In Figs. 1 to 6 inclusive the connecting members have a passage 46 extending through the hollow end portion 44 and terminating at one end in a threaded internal connection 48 to receive the threaded end of a pipe (not shown). The opposite end of the passage 46 is adapted for communication with any one of the ports 40 on that side of the valve seat 12 where the connecting member is positioned. When thus selectively positioned, the passage 46 in each member will be in axial alignment with one of the ports 40 on either side of the valve seat 12. The arrangement thus permits either one of the pair of duplicate connecting members 44 to be utilized as an outlet connection while the other is utilized as an inlet connection providing that the pipes to which the members are connected are of the same size. However, should there be variation in this respect, it will be apparent that hollow end portions 44 of different sizes with respect to the threaded end 48 could be utilized.

The annular portion 42 of each connecting member is rotatable on the tubular member 10 in order to align the passages 46 with any one of the ports 40 as previously explained. When such alignment has occurred, each annular portion 42 is moved laterally into engagement with opposite faces of an external annular abutment 50 which extends from the tubular member 10 opposite the valve seat 12. The opposite faces of the abutment 50 form oppositely disposed seats for each annular portion 42 and a packing ring 52 may be interposed between these abutting end faces for sealing against leakage.

In order to locate the connecting members in the selected positions on the tubular member 10 interengaging means are employed. These means take the form of a plurality of narrow ribs or key projections 54 on the abutment 50 each of which is adapted selectively to enter into a recess 56 formed on each connecting member between the annular portion 42 and the hollow end portion 44. Preferably, the bottom wall of each recess 56 is spaced from the adjacent end of the projection 54 in order to ensure sealing engagement between the abutting end faces of the annular portion 42 and the annular abutment 50.

Each projection 54 extends parallel with the axis of the tubular member 10 and is longitudinally aligned with the axes of two oppositely disposed ports 40. Thus, in this embodiment four such projections 54 are provided, one for each pair of oppositely disposed ports 40 formed in the tubular member 10. It will be observed from Figs. 5 and 6 that the recess 56 is in substantial radial alignment with the axis of the passage 46 to effect alignment of this passage with a port 40 when the connecting member is positioned on the tubular member 10. Thus, correct assembly of the parts to obtain the desired inlet and outlet arrangements without any obstruction of the fluid flow is obtained and any misalignment is avoided. Preferably, the recess 56 on one side of each connecting member is duplicated, as at 58, on the opposite side of each connecting member in order that these members may be placed in reverse position on the tubular member 10 if desired.

Each of the connecting members may be provided with means for mounting the control device in a selected location at the point of use. Thus, a lug 57 projects transversely from the annular portion 42 of each connecting member opposite the hollow end portion 44. The lug 57 is approximately equal to the width of the annular portion 42 across the end faces thereof and is relatively shallow in thickness. A perforation 59 is provided in the lug 57 for the reception of a bolt, screw or other securing means when the device is installed.

It is apparent that convenient mounting means is thus provided and that undesirable projections on the tubular member 10 or the necessity of separate straps or similar holding devices is eliminated. Moreover, where piping arrangements permit, the connecting members can be adjusted on the tubular member 10 to vary the relative position of the lugs 57 to each other as long as the passages 46 are aligned with the ports 40. In this manner, the installation of the device in different locations is facilitated. In other words, the adjustable connecting members not only permit the inlet and outlet adjustment explained but also the adjustment of the lugs where the position of the latter is paramount.

The connecting members are secured in the selected position by means movable relatively to the tubular member 10 from opposite ends thereof. This means takes the form of end cap members 60 and 61 which may be generally similar in form except as necessarily modified by the particular structure of the control device. In this embodiment the end cap 60 which is located at that end of the tubular member having the electromagnetic device 14, is provided with internal threads 62 which engage complemental threads on the tubular member 10 for securing the connecting member in position. The end cap 60 has a flange 63 extending partly around the electromagnetic device 14 and through which the terminal connector 20 projects. The terminal connector 20 is threaded for engagement by a nut 64 which abuts the end face of the end cap 60 and serves to secure the electromagnetic device 14 against endwise movement.

At the opposite end of the control device, the end cap 61 also has its internal threaded end 62 engaging a complemental threaded end of the tubular member 10. In addition, this end cap 61 is provided with a threaded bore 66 which engages a threaded portion of the reset housing 22 and serves to secure the reset housing 22 in position in the cap 61. It will be apparent that these minor modifications or differences between the two end caps 60 do not detract from their usefulness as stock or standard parts, as the modification can readily be made by simple machining on stock castings. A flange 65, similar to the flange 63, projects from the end cap 61 around the end of the reset housing 22 and is apertured to permit the push button 24 to project.

A second pair of packing rings 68 may be provided between the abutting faces of the end caps 60 and 61 and the annular portion 42 of each of the connecting members to seal against leakage at these points.

Figure 7:
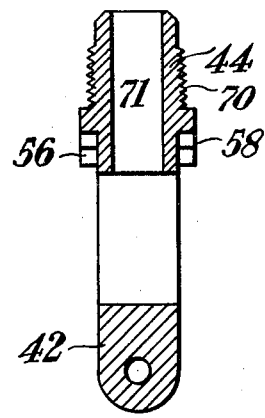
Fig. 7 is a cross section through a modified form of connector.
Figure 6:
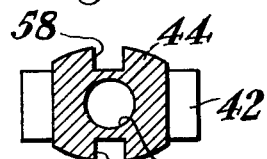
Fig. 6 is a section taken on the line VI—VI of Fig. 5.
Figure 9:
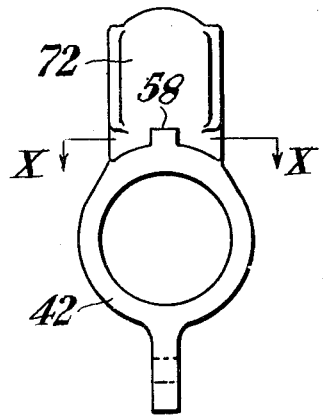
Fig. 9 is an end elevation of the connector shown in Fig. 8.
Figure 8:
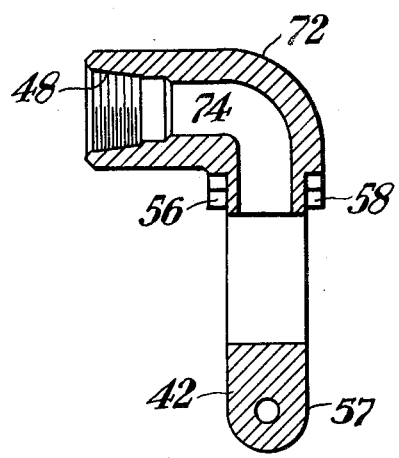
Fig. 8 is a cross section through a further modified form of connector.
Figure 10:
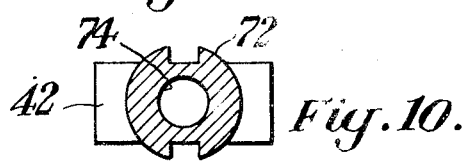
Fig. 10 is a section taken on the line X—X of Fig. 9.

As disclosed in the embodiment shown in Fig. 7, the hollow end portion 44 of the connecting members could equally well be externally threaded as at 70 instead of being provided with the internal threads 48 as shown in Fig. 1. Thus, the modified form shown in Fig. 7 could be substituted for both of the connecting members disclosed in Fig. 1 or for either of them, as desired. In the further modification disclosed in Figs. 8 to 10 inclusive an elbow type fitting 72 having an angular passage 74 has been substituted for the straight hollow end portion 44 of the previous embodiments. As this modification in the hollow end portion is the only change required, further description is deemed unnecessary.

It will now be apparent that the body construction is made up of a small number of parts which can be standardized. With this feature it is possible to obtain many different arrangements of inlet and outlet connections by simple assembly operations requiring a minimum of skill to insure correct installation of the various parts in desired position.

It will further be apparent that many changes may be made in the details of construction and combination of parts herein disclosed within the scope of the appended claims without departing from the spirit of the invention.

We claim:

1. A body for control devices comprising a tubular body member having an enlarged external portion providing an external annular seat intermediate the ends of said member, the wall of said body adjoining said enlarged portion having a substantially cylindrical outer surface, a plurality of ports in said wall of said member, said ports being spaced apart circumferentially of said member, a connecting member having an annular portion with an inner surface complemental with said external surface and mounted on said tubular member with said inner and outer surfaces interengaging, said connecting member having an end portion extending radially outward from said annular portion, said annular portion and end portion having a radially extending port adapted for communicating relation with any one of said first mentioned ports, means engageable with said tubular member for securing said connecting member against said external seat, and interengaging means between said enlarged external portion and said connecting member for selectively locating said connecting member circumferentially of said tubular member with the port of said connecting member aligned with one of the other said ports.

2. A body for control devices as claimed in claim 1 wherein said interengaging means includes a projection on one of said members engageable with the walls of a recess in the other of said members when said relation is established.

3. A body for control devices as claimed in claim 2 wherein said means for securing said connecting member against said external seat includes an end cap member threaded on said tubular member for operative engagement with said annular portion.

4. A body for control devices as claimed in claim 3 wherein a pair of packing rings extend around said tubular body member on opposite sides of said connecting member for sealing against leakage between said cap and said seat.

SAMUEL G. ESKIN.
PERRY C. HAYDEN.

REFERENCES CITED

The following references are of record in the file of this patent:

UNITED STATES PATENTS

| Number | Name | Date |
|---|---|---|
| 193,087 | Holly | July 17, 1877 |
| 464,620 | Decarie | Dec. 8, 1891 |
| 1,106,933 | Farley | Aug. 11, 1914 |
| 1,217,132 | Amos | Feb. 27, 1917 |
| 1,518,221 | Reiber | Dec. 9, 1924 |
| 1,696,757 | Ford | Dec. 25, 1928 |
| 1,928,688 | Hayward | Oct. 3, 1933 |
| 2,242,303 | Irmischer | May 20, 1941 |

FOREIGN PATENTS

| Number | Country | Date |
|---|---|---|
| 51,325 | Switzerland | Mar. 4, 1910 |
| 8,479 | Great Britain | of 1911 |
| 507,163 | Great Britain | June 12, 1939 |